United States Patent [19]
Huang

[11] Patent Number: 5,905,257
[45] Date of Patent: May 18, 1999

[54] PARALLEL TRANSMISSION DEVICE FOR REFLECTION MEANS AND SCANNING MEANS IN A SCANNER

[75] Inventor: Chun-Hsien Huang, Taipei Hsien, Taiwan

[73] Assignee: Sampo Corporation, Taipei, Taiwan

[21] Appl. No.: 08/934,629

[22] Filed: Sep. 22, 1997

[51] Int. Cl.[6] ........................................... H01J 3/14
[52] U.S. Cl. ........................................... 250/234; 250/216
[58] Field of Search ................................... 250/234, 236, 250/216; 355/55

[56] References Cited

U.S. PATENT DOCUMENTS 4,607,943  8/1986  Yoshioka et al. ............................ 355/55

*Primary Examiner*—Que T. Le
*Attorney, Agent, or Firm*—Rosenberg, Klein & Bilker

[57] ABSTRACT

A parallel transmission device for reflection means and scanning means of a scanner, comprises fixing stage, reflection means, scanning means, fixing module, belt wheel, idle wheel, belt, tight wire, and driving means, wherein the reflection means is driven by the belt and can drive the scanning means by the tight wire to ensure that the scanning means and reflection means has a parallel movement therebetween, and has a speed ratio 2:1, i.e. the reflection means moves only half of the distance of the scanning means, thus reducing the space reserved for the movement of the reflection means and saving the internal space of the scanner.

3 Claims, 5 Drawing Sheets

PARALLEL TRANSMISSION DEVICE FOR REFLECTION MEANS AND SCANNING MEANS IN A SCANNER

BACKGROUND OF THE UTILITY

The present utility relates generally to a parallel transmission device for reflection means and scanning means of a scanner, more particularly, to a parallel transmission device which can ensure the ensure the absolutely parallel movement between reflection means and scanning means, and move the reflection means and scanning means with speed ratio 2:1 during and after the scanning procedure.

The conventional scanner include generally a light source, reflection mirrors, camera and CCD (charge coupled device) to control the optical path. More specifically, the light generated by light source is impinged upon the object to be scanned and the reflected by the object is reflected by a reflection mirror to the camera. The light focused by camera is sent to a CCD to transform the light into analog or digital signal.

However, in above-structured scanner, reflection means (reflection mirror) must move the same distance as that of scanning means, because light source, reflection mirrors, camera and CCD are arranged on the same module. Accordingly, the space reserved for the movement of reflection means is considerably large and influence the arrange of other devices.

SUMMARY OF THE UTILITY

It is an object of the present utility to provide a parallel transmission device for reflection means and scanning means of a scanner, which has been arranged with tight wire and belt to ensure the absolutely parallel movement between reflection means and scanning means, and to move scanning means and reflection means with speed ratio 2:1, i.e. reflection means proceeding a distance half of scanning means, thus reducing the space reserved for the movement of reflection means and saving the internal space of scanner.

BRIEF DESCRIPTION OF THE DRAWING

In order to better understand the present utility, reference should be made to the following detailed description taken in junction with the accompanying drawing wherein.

BRIEF DESCRIPTION OF THE NUMERAL

| 10 | fixing stage | 10a | fixing point |
|---|---|---|---|
| 10b | fixing point | 11 | reflection means |
| 11a | fixing part | 11b | fixing part |
| 12 | scanning means | 12a | fixing part |
| 12b | fixing part | 13 | fixing module |
| 14 | first belt wheel | 15 | second belt wheel |
| 16 | third belt wheel | 17 | first idle wheel |
| 18 | second idle wheel | 19 | third idle wheel |
| 20 | fourth idle wheel | 21 | fifth idle wheel |
| 22 | sixth idle wheel | 23 | seventh idle wheel |
| 24 | belt | 25 | tight wire |
| 26 | driving means | 27 | guiding track |

DETAILED DESCRIPTION OF THE UTILITY

Figure 1:
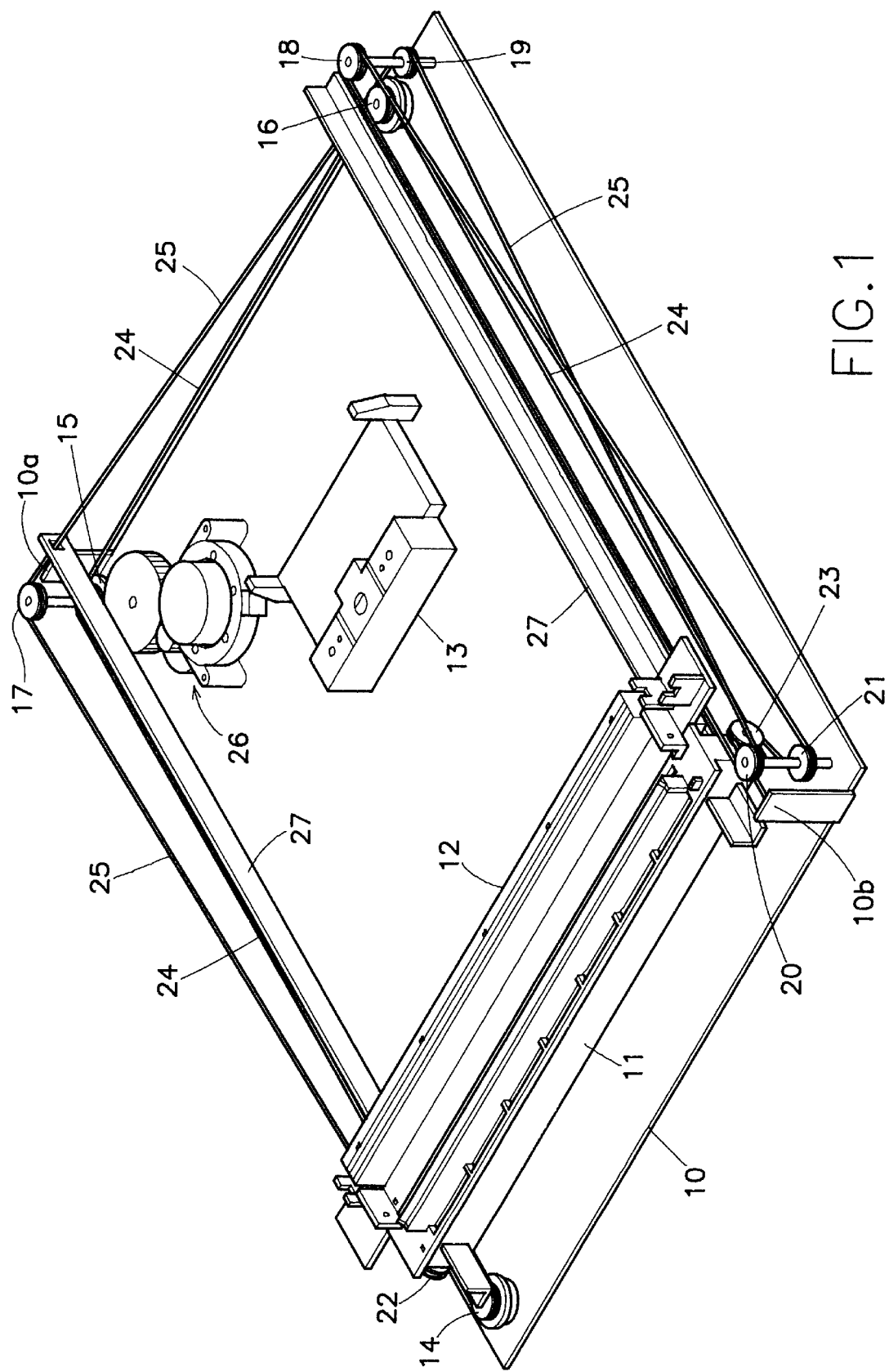
FIG. 1 is a perspective view of present utility.
Figure 2:
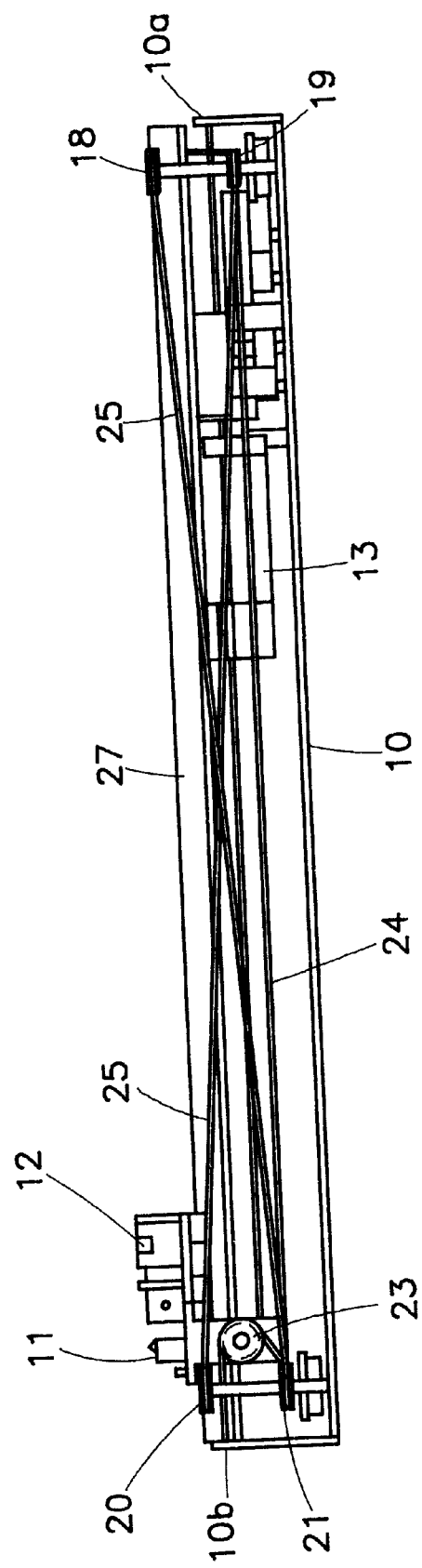
FIG. 2 is a side view of present utility.
Figure 3:
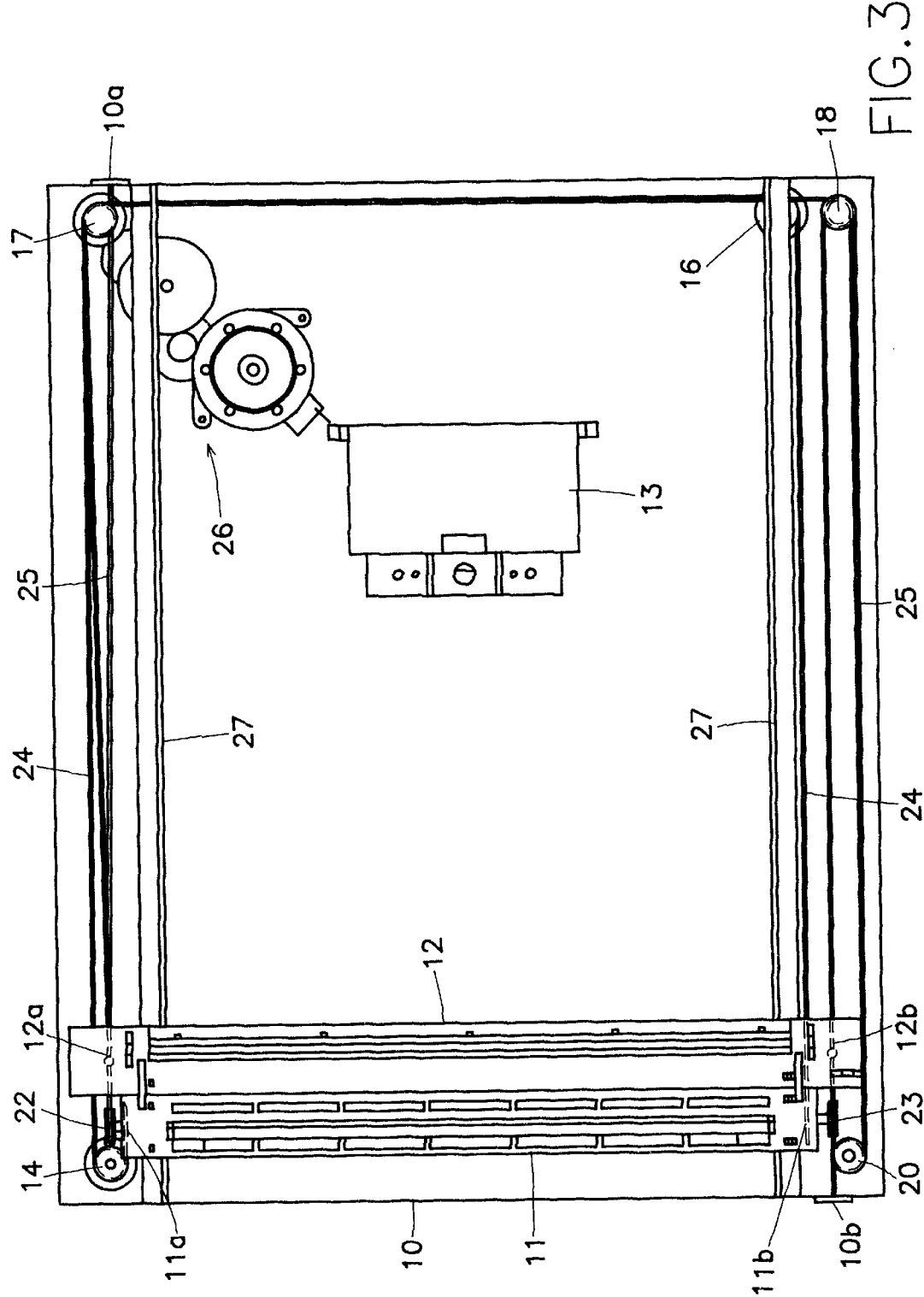
FIG. 3 is a top of present utility.

FIGS. 1, 2, and 3 are the perspective view, side view and top view of present utility, respectively. The present utility provide a parallel transmission device for reflection means and scanning means of a scanner, which comprises a fixing stage 10, a reflection means 11, a scanning means 12, a fixing module 13, a first belt wheel 14, a second belt wheel 15, a third belt wheel 16, a first idle wheel 17, a second idle wheel 18, a third idle wheel 19, a fourth idle wheel 20, a fifth idle wheel 21, a sixth idle wheel 22, a seventh idle wheel 23, a belt 24, a tight wire 25, a driving means 26.

More specifically, fixing stage 10 is provided within scanner or integral with scanner. The reflection means 11 and the scanning means 12 are arranged slidingly on guiding track 27 of fixing stage 10, and can be moved forward and backward stably in a parallel way. The fixing module 13 is fixed on fixing stage 10. A light source and reflection mirror (not shown) are arranged fixedly within scanning means 12, reflection mirror (not shown) is arranged fixedly within reflection means 11, and camera and CCD are arranged fixedly within fixing module 13. The driving means 26 which can drive belt 24 for rotary motion is arranged fixedly on fixing stage 10.

First belt wheel 14, second belt wheel 15, and third belt wheel 16 are arranged on three corners of the fixing stage 10. The belt 24 wraps around first belt wheel 14, second belt wheel 15, and third belt wheel 16 with one end fixed on one side of the reflection means through fixing part 11a and another end fixed on another side of the reflection means through fixing part 11b.

The first idle wheel 17 arranged on one corner of the fixing stage 10 is coaxial with and above the second belt wheel 15. The second idle wheel 18 arranged on one corner of the fixing stage 10 and beside the third belt wheel 16 is coaxial with and above the third idle wheel 19. The fourth idle wheel 20 arranged.on one corner of the fixing stage 10 is coaxial with and above the fifth idle wheel 21. The sixth idle wheel 22 and the seventh idle wheel 23 are arranged on both side of the reflection means 11, respectively.

The tight wire 25 wraps around the sixth idle wheel 22, first idle wheel 17, third idle wheel 19, fourth idle wheel 20, second idle wheel 18, fifth idle wheel 21 and seventh idle wheel 23 with one end fixed on one side of the fixing stage 10 through fixing part 10a and another end fixed on another side of the fixing stage 10 through fixing part 10b. Moreover, the portion of tight wire 25 between sixth idle wheel 22 and first idle wheel 17 is connected integrally to one end of scanning means 12 through a fixing part 12a, the portion of tight wire 25 between fourth idle wheel 20 and second idle wheel 18 is connected integrally to another end of scanning means 12 through a fixing part 12b.

Figure 4:
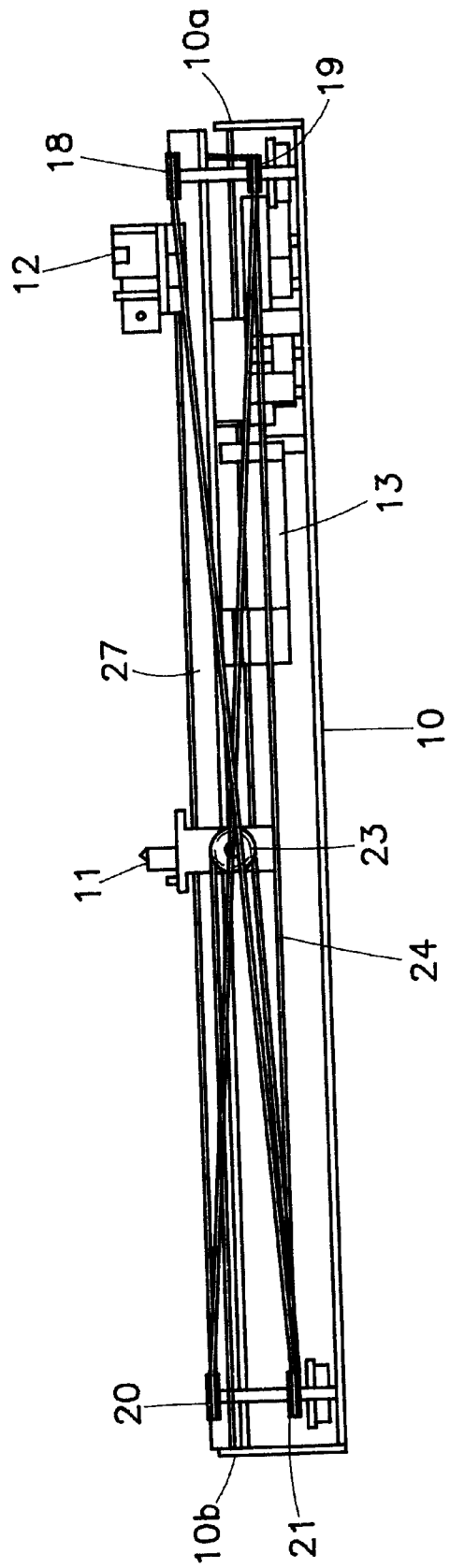
FIG. 4 is a view showing the operation of present utility.
Figure 5:
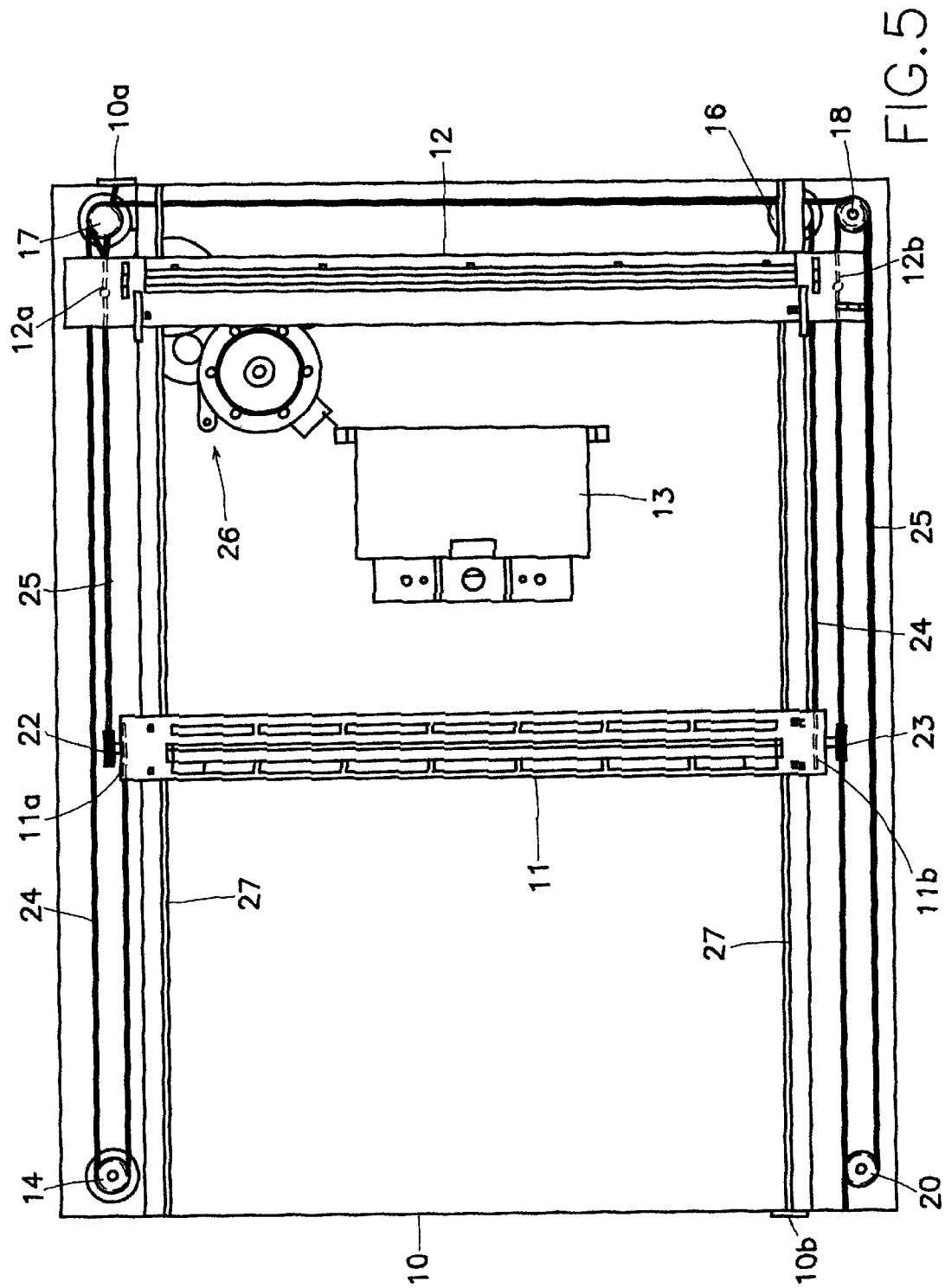
FIG. 5 is a top view showing the operation of present utility.

The driving means 26 can drive belt 24 for rotary motion, therefore, the reflection means 11 can be moved forward and backward due to the clockwise and counter clockwise rotation of driving means. Meanwhile, the reflection means 11 can drive the scanning means to move forward and backward by the rotation of tight wire 25 around sixth idle wheel 22 and seventh idle wheel 23. The light generated by light source of scanning mean 12 is impinged upon the object to be scanned and the reflected by the object is reflected by reflection mirror of scanning means 12 and reflection means 11 to the camera of fixing module 13. The light focused by camera is sent to a CCD to transform the light into analog or digital signal. The scanning means 12 and reflection means 11 according to present utility are driven by tight wire 25 to ensure their absolutely parallel movement therebetween, and move with speed ratio 2:1 (as shown in FIGS. 4 and 5). The reflection means 11 move a distance only half of that of the scanning means, thus reducing the space reserved for the reflection means 11 and saving the internal space of scanner for placement of other devices.

As previously described, the present utility provide a parallel transmission device for reflection means and scanning means of a scanner which can overcome the problems of conventional scanner, such as the same moving distance of scanning means and reflection means, and the space reserved for the movement of reflection means.

While the present utility has been described in connection with what is presently considered to be the most practical and preferred embodiments, it is to be understood that the invention is not limited to the disclosed embodiment, but, on the contrary, it is intended to cover various modification and equivalent arrangement included within the spirit and scope of the appended claims.

What is claimed is:

1. A parallel transmission device for reflection means and scanning means of a scanner comprises:

a fixing stage;

a reflection means arranged movably on said fixing stage;

a scanning means arranged movably on said fixing stage and parallel with said reflection means;

a fixing module fixed on said fixing stage;

a driving means fixed on said fixing stage;

a first belt wheel, a second belt wheel, and a third belt wheel arranged on three corners of said fixing stage, respectively;

a belt wrapping around said first belt wheel, said second belt wheel, said and third belt wheel with one end fixed on one side of said reflection means and another end fixed on another side of said reflection means;

a first idle wheel, a second idle wheel, a third idle wheel, a fourth idle wheel, a fifth idle wheel, a sixth idle wheel and a seventh idle wheel, wherein said first idle wheel being coaxial with said second belt wheel, said second idle wheel being coaxial with said third idle wheel and arranged on said fixing stage and beside said third belt wheel, said fourth idle wheel being coaxial with said fifth idle wheel and arranged on said fixing stage, said sixth and seventh idle wheels being arranged on both sides of said reflection means;

a tight wire wrapping around said sixth idle wheel, said first idle wheel, said third idle wheel, said fourth idle wheel, said second idle wheel, said fifth idle wheel and said seventh idle wheel with one end fixed on one side of said fixing stage and another end fixed on another sides of said fixing stage, moreover, said tight wire being fixed to both side of said scanning means.

2. A parallel transmission device for reflection means and scanning means of a scanner as in claim 1, wherein the portion of said tight wire between said sixth idle wheel and said first idle wheel is connected to one end of said scanning means through a fixing part, the portion of said tight wire between said fourth idle wheel and said second idle wheel is connected to another end of said scanning means through a fixing part, thus fixing said tight wire to both end of said scanning means.

3. A parallel transmission device for reflection means and scanning means of a scanner as in claim 1, wherein said reflection means and said scanning means are arranged movably on the guiding track of said fixing stage.

* * * * *